Feb. 3, 1959     C. B. SPASE     2,872,005
DRIVE MECHANISM
Filed March 4, 1957
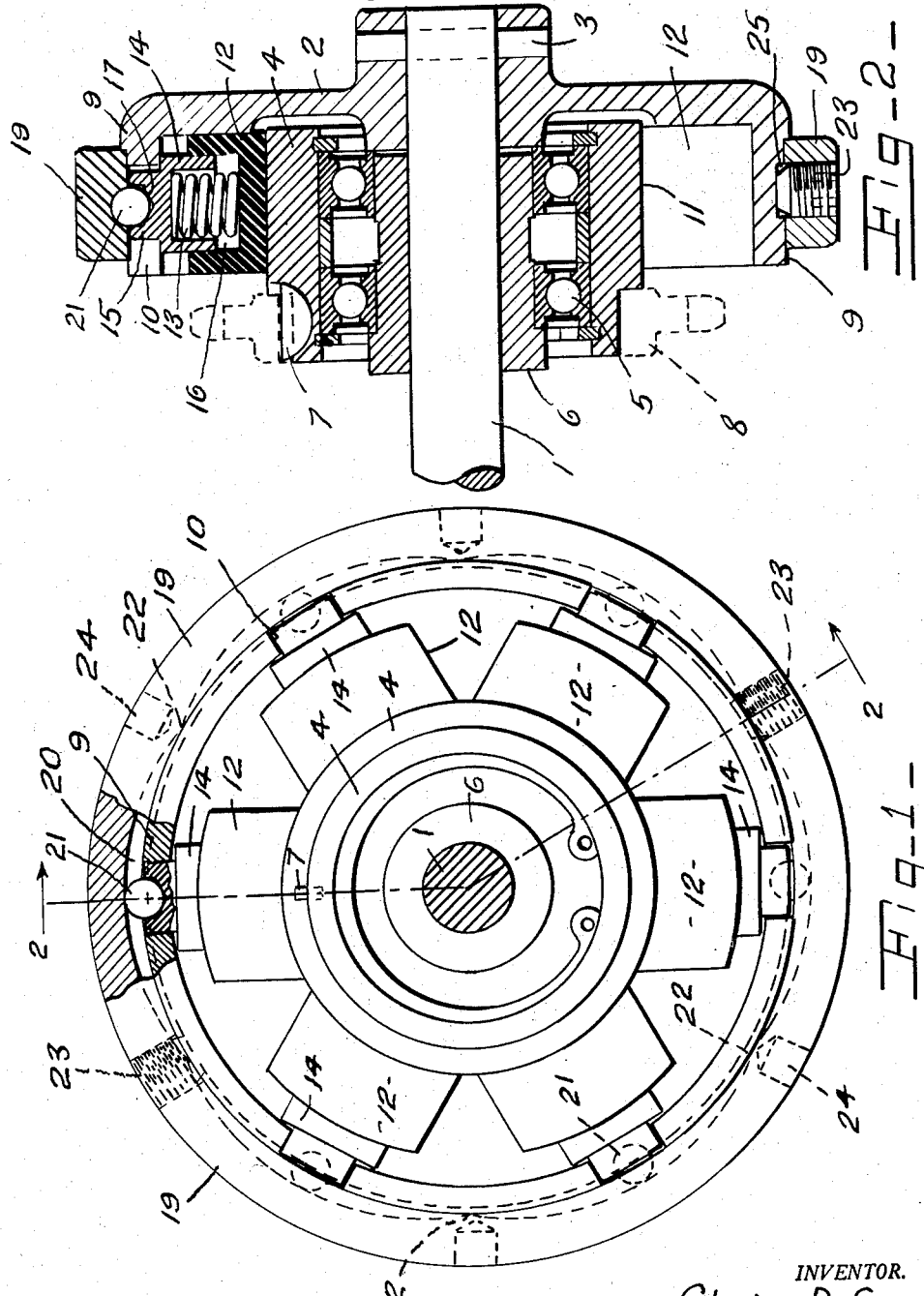
INVENTOR.
Charles B. Spase
BY
L. Emmett Thompson
ATTORNEY.

United States Patent Office 2,872,005
Patented Feb. 3, 1959

2,872,005

DRIVE MECHANISM

Charles B. Spase, Syracuse, N. Y., assignor to Lipe-Rollway Corporation, Syracuse, N. Y., a corporation of New York Application March 4, 1957, Serial No. 643,736

4 Claims. (Cl. 192—104)

In many industrial applications, it is necessary that the power supplied to a driven member, or machine, be limited to some predetermined maximum and the drive mechanism be capable of adjustment so that the maximum torque may be increased or decreased.

For example in wire drawing machines, it is most practical that the spool on which the wire is wound, and which draws the wire through the die, be rotated at a constant speed.

The torque required to draw wire varies according to the size of the wire and the material from which the wire is being drawn. However for a given situation it is desirable that the torque applied to the spool have some predetermined value to prevent stretching the wire to make it undersize or breaking the wire. Where the wire is wound on the spool, as the accumulation increases in diameter, the wire is drawn faster requiring more torque to be applied to the spool, and if the torque applied to the spool is unlimited the wire will be stretched or broken.

Therefore it is desirable that the driving unit function to limit the torque to a predetermined maximum and to provide for varying said predetermined maximum.

My invention contemplates and solves both problems by the use of a drive mechanism wherein the torque delivered is limited to a predetermined maximum and the mechanism may be adjusted to increase or decrease the maximum torque output.

The invention consists in the novel features and in the combinations and constructions hereinafter set forth and claimed.

In describing this invention, reference is had to the accompanying drawings in which like characters designate corresponding parts in all the views.

In the drawings—

Figure 1 is a front plan view of the transmission device shown partly in section.

Figure 2 is a cross section taken on the line 2—2 of Figure 1.

In the device, 1 indicates the drive shaft. 2 indicates the drive member which is affixed to the drive shaft by means of a pin 3. A driven member 4 is journalled on bearings 5 which are, in turn, mounted upon a sleeve 6 also mounted on the driven shaft 1. Keyed to the driven member 4, at 7, is a driven sprocket shown by hidden lines at 8. This sprocket may have a chain connection to a wire drawing spool, for example. The drive member has an inwardly extending flange 9 formed with a plurality of slots 10. This flange encircles a drum surface 11 on the driven member.

The friction shoes 12 are yieldingly forced into engagement with the drum surface 11 by a plurality of helical compression springs 13 mounted in cylindrical shaped thimble members 14 having reduced end portions 15 mounted in the slots 10. The shoes 12 are formed with recesses 16 for slidably receiving the thimble members 14, the compression springs 13 acting against the thimbles and the shoes 12 to urge the shoes 12 against the drum 4. The thimbles 14 serve as driving means between the flange of the driving member and the shoes. Accordingly, the amount of torque transmitted from the drive shaft 1 to the sprocket 8 is in proportion to the force exerted on the shoes by the springs 13.

The peripheral surface of the flange 9 is machined to receive an annular ring 19. The inner surface of this ring is formed with a series of circumferentially extending grooves 20 for the reception of balls 21 and the outer end portions 15 of the thimble drive members are recessed to receive the balls 21. The grooves in the ring 19 are of arcuate formation on a radius less than the bore of the flange 9 whereby the ends of the grooves merge with the inner surface of the ring 19, as indicated at 22. In Figure 1, the balls 21 are shown positioned at the mid point of each of the grooves 20—that is, at the point of greatest depth of the grooves. When the ring 19 is rotated upon the flange 9, the balls 21 are cammed inwardly, thereby effecting inward movement of the thimbles 14 and greater pressure upon the springs 13, and thus increasing the frictional engagement between the shoe 12 and the drum surface 11, whereby the torque output of the unit is increased.

The ring 19 is provided with one or more set screws 23 for securing it in adjusted position. These screws contacting the periphery of the flange 9 and the ring 19 are provided with one or more recesses 24 to receive a pin or spanner wrench for conveniently effecting the rotatable adjustment of the ring. According, the ring 19 may be adjusted to provide a desired maximum torque output from the unit which may be increased or decreased by adjustment of the ring 19. If the load applied to the sprocket 8 exceeds the predetermined torque output, slippage will occur between the shoes 12 and the drum surface 11. As previously stated, this drive is particularly well suited for many applications, such as a wire drawing machine where the torque varies not only in accordance with the diameter of the wire being drawn and with the material from which the wire is drawn but also varies in accordance with the accumulation of wire wound on the drawing spool or reel. The latter variation is automatically taken care of. As the diameter of the accumulated wire on the reel increases, the linear speed of the wire increases, and this would normally increase the pull on the wire, resulting in the wire being stretched down to a smaller diameter than desired, or in breaking the wire. However with my drive mechanism the torque or pulling force applied to the wire is limited to a predetermined maximum.

What I claim is:

1. A drive mechanism comprising a driven member having a friction drum surface, a driving member having a portion encircling said drum and carrying a series of radially movable friction shoes engaging said drum, a series of radially disposed compression springs abutting said shoes for radially urging said shoes against the drum, and adjusting means mounted for rotation on said portion of the driving member for varying the compression of said springs upon relative rotation with respect to said portion of said adjusting means.

2. A drive mechanism comprising a drive shaft, a driving member mounted on said shaft for rotation therewith, a driven member journalled on said shaft and having a friction drum surface, said driving member having a portion encircling said drum surface in concentric spaced relation thereto, a circular series of at least three radially movable friction shoes positioned between said portion of the driving member and said drum surface, radially disposed spring means operable to radially urge said shoes in engagement with said friction drum surface, and means operable to simultaneously vary the pressure on said spring means.

3. A drive mechanism comprising a driven member having a friction driven surface, a driving member having a flange encircling said surface, a series of radially movable friction shoes positioned between said flange and surface, a series of spring holders mounted in said flange for radial movement therein, a compression spring mounted in each of said holders and acting against one of said shoes, an annular member mounted on said flange for rotation in respect thereto, means to fix said annular member against rotations relative to said flange, and means operatively connected with said annular member and said springs for simultaneously effecting radial movement of said spring holders to vary the compression of said springs.

4. A drive mechanism comprising a driven member having a friction driven surface, a driving member having a flange encircling said surface, a series of friction shoes positioned between said flange and surface, a series of spring holders mounted in said flange for radial movement therein, a compression spring mounted in each of said holders and acting against one of said shoes, an annular member mounted on said flange for rotation in respect thereto, means to fix said annular member against rotations relative to said flange, and means operatively connected with said annular member and said springs for simultaneously effecting radial movement of said spring holders to vary the compression of said springs, said last mentioned means comprising a ball positioned in the outer end of each of said spring holders and a cam groove in said annular member engaging each of said balls for effecting radial movement thereof.

References Cited in the file of this patent

UNITED STATES PATENTS

| | | |
|---|---|---|
| 929,049 | Strite | July 27, 1909 |
| 1,976,791 | Ljungstrom | Oct. 16, 1934 |
| 2,005,486 | Wilson | June 18, 1935 |
| 2,054,095 | Pitman | Sept. 15, 1936 |
| 2,225,072 | Meyerhoefer | Dec. 17, 1940 |
| 2,678,031 | Spase et al. | May 11, 1954 |

FOREIGN PATENTS

| | | |
|---|---|---|
| 283,908 | Germany | Apr. 30, 1915 |
| 163,414 | Great Britain | May 5, 1921 |